(12) United States Patent
Bhandaru et al.

(10) Patent No.: US 11,200,210 B2
(45) Date of Patent: Dec. 14, 2021

(54) METHOD OF EFFICIENT BACKUP OF DISTRIBUTED FILE SYSTEM FILES WITH TRANSPARENT DATA ACCESS

(71) Applicant: Intel Corporation, Santa Clara, CA (US)

(72) Inventors: Malini K. Bhandaru, San Jose, CA (US); Uma Maheswara Rao Gangumalla, Santa Clara, CA (US); Niraj Rai, Los Altos Hills, CA (US); Rakesh Radhakrishnan Potty, Bangalore (IN); Kai Zheng, Shanghai (CN); Yi Chen, Shanghair (CN); Qiyuan Gong, Shanghai (CN); Varsha Parthasarathy, San Jose, CA (US); Vinod Sharma, Menlo Park, CA (US); Nofil Fawad, Phoenix, AZ (US); Wei Zhou, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/958,224

(22) PCT Filed: Mar. 26, 2018

(86) PCT No.: PCT/CN2018/080450
§ 371 (c)(1),
(2) Date: Jun. 26, 2020

(87) PCT Pub. No.: WO2019/183748
PCT Pub. Date: Oct. 3, 2019

(65) Prior Publication Data
US 2020/0349124 A1 Nov. 5, 2020

(51) Int. Cl.
*G06F 16/182* (2019.01)
*G06F 16/16* (2019.01)
(Continued)

(52) U.S. Cl.
CPC .......... *G06F 16/1824* (2019.01); *G06F 16/13* (2019.01); *G06F 16/148* (2019.01);
(Continued)

(58) Field of Classification Search
CPC .. G06F 16/148; G06F 11/1464; G06F 16/164; G06F 16/1824; G06F 16/156;
(Continued)

(56) References Cited

U.S. PATENT DOCUMENTS 8,533,231 B2\* 9/2013 Aizman ................ G06F 16/182
707/793
2011/0313973 A1\* 12/2011 Srivas ................... G06F 16/275
707/634

(Continued)

FOREIGN PATENT DOCUMENTS

CN 106709010 A 5/2017

OTHER PUBLICATIONS

International Search Report and Written Opinion for PCT Patent Application No. PCT/CN2018/080450, dated Dec. 29, 2018, 9 pages.

(Continued)

*Primary Examiner* — Shahid A Alam
(74) *Attorney, Agent, or Firm* — Jaffery Watson Mendonsa & Hamilton LLP

(57) ABSTRACT

Examples include techniques for backing up a file to long term "cold" storage by using circuitry, and logic for execution by the circuitry, to receive a request to back up the file in a distributed file system to cold storage, to copy the file from at least one data node of the distributed file system to cold storage, to set a location of the file in cold storage in a name node of the distributed file system, and to set a length of the file to zero in the name node.

16 Claims, 5 Drawing Sheets

(51) Int. Cl.
  *G06F 16/14* (2019.01)
  *G06F 16/22* (2019.01)
  *G06F 16/13* (2019.01)
(52) U.S. Cl.
  CPC .......... *G06F 16/156* (2019.01); *G06F 16/164* (2019.01); *G06F 16/2282* (2019.01)
(58) Field of Classification Search
  CPC ............... G06F 16/182; G06F 16/2282; G06F 11/1451; G06F 16/13
  USPC ........................................................ 707/827
  See application file for complete search history.

(56) References Cited

U.S. PATENT DOCUMENTS

| | | | |
|---|---|---|---|
| 2013/0191510 A1* | 7/2013 | Huang | G06F 16/182 |
| | | | 709/219 |
| 2013/0226978 A1* | 8/2013 | Bestler | G06F 16/1752 |
| | | | 707/827 |
| 2015/0067002 A1* | 3/2015 | Shvachko | G06F 16/178 |
| | | | 707/827 |
| 2015/0347451 A1 | 12/2015 | Lee et al. | |
| 2018/0081540 A1 | 3/2018 | Aho et al. | |

OTHER PUBLICATIONS

Park, Nayoung et al., "Cold Data Eviction Using Node Congestion Probability for HDFS based on Hybrid SSD", SNPD 2015, Jun. 3, 2015, pp. 1-6.

* cited by examiner

METHOD OF EFFICIENT BACKUP OF DISTRIBUTED FILE SYSTEM FILES WITH TRANSPARENT DATA ACCESS

CLAIM OF PRIORITY

This application claims priority under 35 U.S.C. § 365(c) to PCT Application PCT/CN2018/080450 filed on Mar. 26, 2018, entitled, "METHOD OF EFFICIENT BACKUP OF DISTRIBUTED FILE SYSTEM FILES WITH TRANSPARENT DATA ACCESS" and is hereby incorporated by reference in its entirety.

TECHNICAL FIELD

Examples described herein are generally related to techniques for improving performance of storing and accessing very large data sets in computing systems.

BACKGROUND

The Apache Hadoop software library (available at hadoop.apache.org) is an open source framework that allows for the distributed processing of large data sets across clusters of high volume servers using simple programming models. It is designed to scale up from single servers to thousands of machines, each offering local computation and storage. Rather than rely on hardware to deliver high-availability, the library itself is designed to detect and handle failures at the application layer, thereby delivering a highly-available service on top of a cluster of computers, each of which may be prone to failures. Hadoop modules include:

Hadoop Common: The common utilities that support the other Hadoop modules;

Hadoop Distributed File System (HDFS™): A distributed file system that provides high-throughput access to application data;

Hadoop Yet Another Resource Negotiator (YARN): A framework for job scheduling and cluster resource management; and Hadoop MapReduce: A YARN-based system for parallel processing of large data sets.

With use cases such as Autonomous Driving (AD), autonomous flying drones, and Internet of Things (IOT) gaining traction, sensor data pressure in data centers is pushing the data handling capabilities of big data frameworks such as those based on the Apache HDFS™.

For instance, vehicle sensor assemblies comprised of MobileEye™ and axis cameras, light detection and ranging (LiDAR), sound navigation and ranging (Sonar), global position system (GPS) and others can generate from 5 to 40 Tera Bytes (TB) of data per car per day. Sensor data rapidly transitions from Hot to Warm to Cold with possibly revisits as the sensor data passes through initial parsing, use in machine learning and simulation, and then possibly revisited for new learnings, but much of the data may be maintained for years to meet governmental regulatory requirements. Such sensor data laden systems require advanced tiered-storage systems having storage media agnostic data retrieval with support for cheap external backup storage, such as optical disk arrays or the cloud, to both reduce total cost of ownership and yet support the above use cases.

DETAILED DESCRIPTION

Figure 1:
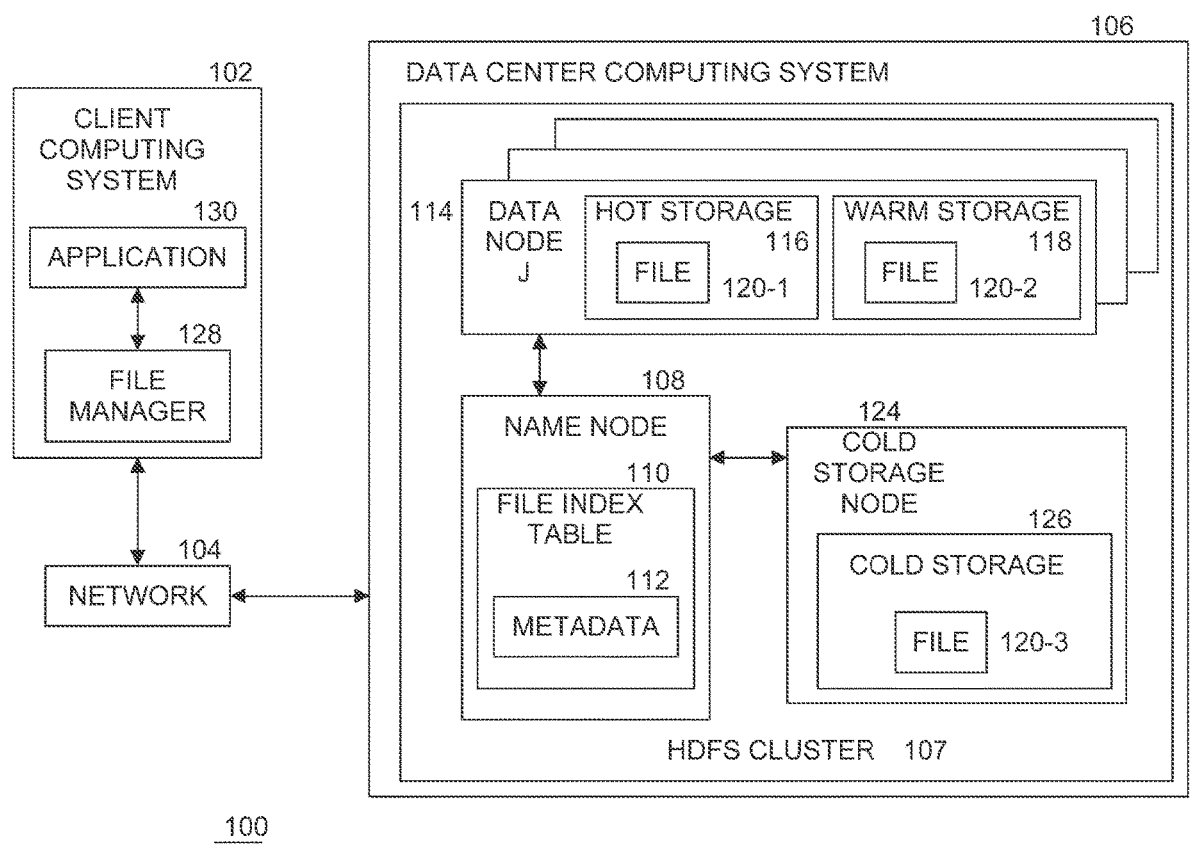
FIG. 1 illustrates an example computing system.

Computing systems are struggling with managing the vast expansion of data being generated by applications for new use cases such as autonomous vehicles, drones, the Internet of Things (IoT), and other data intensive applications. When data is first captured, the data may be considered to be Hot, as the data needs to be processed. In some computing systems, Hot data may be stored in fast access memories such as random-access memory (RAM) or solid-state disk drives (SSDs). After the data is first processed, the data may be accessed again at a later time with lower requirements as to access speed. In that case, the data may be considered to be Warm. In some computing systems, Warm data may be stored in hard disk drives (HDDs). In some cases, the data may not need to be accessed again in the short term, but may need to be archived for long term storage. In that case, the data may be considered to be Cold. In some computing systems, Cold data may be stored on optical disks or other long-term storage media. In terms of data size, in some computing systems, over time there may be more Cold data than Warm data, and more Warm data than Hot data. Thus, the cost of storing data (whether Hot, Warm or Cold), may be taken into account when designing cost-efficient, multi-tiered storage solutions. In some computing systems, the cost of storage per gigabyte (GB) may be higher for Hot data than for Warm data, and higher for Warm data than for Cold data. Accordingly, efficient mechanisms are needed to backup data from a Hot or Warm storage location to a Cold storage location, and also to retrieve backed up data from Cold storage when necessary.

Some computing systems provide for Hot, Warm, and Cold storage of data. However, these computing systems have many disadvantages. Some computing systems maintain three copies of the data (e.g., Hot, Warm, and Cold copies) to promote resiliency and redundancy in case of device failure, thereby wasting storage and incurring increased cost. Some computing systems using commodity hardware typically replicate data at the block level, object level, or file level on multiple data nodes. When data movement is triggered by a change in status from Hot to Warm, or from Warm to Cold, each replica is moved. A block level copy to Cold storage entails multiple copies of the same data being made on the Cold storage device, thereby wasting network bandwidth. Further, when write-once optical disks are used as the Cold storage medium, the multiple copies of the same data in Cold storage wastes space on the optical disk media (which is not recoverable). When replication happens at the block level, and only a HDFS™ Name Node tracks all of the "file to block" mappings, file level data cannot be accessed directly from the Cold storage device. Further, in block storage systems such as HDFS™ with block level mappings, the data retrieval path involves visiting a HDFS™ Data Node that tracks the requested block, thereby incurring an extra hop in the system for data access. This kind of access is inefficient.

Some computing systems have separate namespaces for HOT, WARM, and COLD data. The lack of global namespace results in a lack of transparency about the actual data location, making retrieval more complex. Some computing systems suffer from write lock starvation problems, where a lock used to control access to storage devices is shared across data processing nodes, causing unnecessary delays in data access and high data access latency and low data write performance.

As contemplated in the present disclosure, many of these disadvantages may be overcome. FIG. 1 illustrates an example computing system according to embodiments of the present invention. Client computing system 102 may access data center computing system 106 over network 104. Client computing system may be any kind of computing system generating and/or obtaining data to be stored in and retrieved from data center computing system 106. Client computing system 102 may include one or more application program(s) 130 to obtain, generate, process, store and/or retrieve data. Network 104 may be any kind of network. In one example, network 104 may be the Internet. In other examples, network 104 may be a local area network (LAN) or a wide area network (WAN). Data center computing system 106 may comprise one or more computing platforms. In an embodiment, data center computing system 106 may be collocated with client computing system 102 at the same site. In other embodiments, data center computing system 106 may be located at a site different than client computing system 102 (e.g., in a data center or server farm at a data processing facility remote from the client computing system and accessible over network 104). In embodiments, data center computing system 106 supports data accesses according to a distributed file system. In at least one embodiment, Apache Hadoop may be used including file management operations according to HDFS™. In other embodiments, other distributed file systems may be used, such as Ceph (as disclosed at www.ceph.com), and OpenStack SwiftStack (as disclosed at www.swiftstack.com), for example.

In embodiments of the present invention, there may be different kinds of computing platforms in data center computing system 106. In an embodiment, a group of multiple computing platforms within data center computing system 106 may be known as a HDFS™ cluster 107. Data center computing system 106 may include one or more HDFS™ clusters 107. HDFS™ cluster 107 may include one or more Data Nodes, such as Data Node J 114. In embodiments, there may be many Data Nodes (e.g., tens, hundreds, even thousands of Data Nodes) in a data center computing system. In some embodiments, some Data Nodes may be resident at different sites (i.e., different data processing facilities), yet may still be a part of a HDFS™ cluster in a data center computing system. Each Data Node, such as Data Node J 114, may include one or more storage components to store data, and may include one or more processors to provide computing capabilities to process data local to a Data Node. In one embodiment, a Data Node may include Hot storage 116 to store a file 120-1 (a file may include data). Hot storage 116 may comprise one or more fast access memories such as RAM and/or SSDs. In one embodiment, a Data Node may include Warm storage 118 to store a copy of the file 120-2. Warm storage may comprise slower access storage such as a HDD. Any Data Node may include only Hot storage 116, only Warm storage 118, or a combination of Hot storage and Warm storage. In some data processing scenarios and/or at different times, a Data Node may store only file 120-1 in Hot storage 116, only file 120-2 in Warm storage 118, or both file 120-1 in Hot storage and file 120-2 in Warm storage. In some embodiments, a Data Node may also store a copy of Cold storage files.

A HDFS™ cluster may include a logical component to coordinate the storage and retrieval of data within data center computing system 106. This component may be known as Name Node 108. Name Node 108 may receive commands and/or requests from client computing system 102 to store data to a Data Node and/or to retrieve data from a Data Node. Name Node 108 may determine where to store a file in the Name Nodes, where to retrieve a file from the Name Nodes, and manage any other information needed to track storage of files in data center computing system 106. In an embodiment, Name Node 108 may include file index table 110 to store this information. In an embodiment, file index table 110 may include metadata 112 for each file known in data center computing system 106. Metadata 112 may describe characteristics of each file. In an embodiment, there may be only one file index table 110 for HDFS™ cluster 107. In another embodiment, there may be only one file index table 110 for data center processing system 106. In an embodiment, file index table 110 may be structured as a hash table (not shown), with each entry in the hash table corresponding to a file.

Data center computing system 106 may also include one or more Cold Storage Nodes 124. In some embodiments, some Cold Storage Nodes may be resident at different sites (i.e., different data processing facilities), yet may still be a part of the HDFS™ cluster. Each Cold Storage Node 124 may include one or more storage components to store data. In an embodiment, a Cold Storage Node may not include significant capabilities for processing data, other than managing storage and retrieval of data. In one embodiment, a Cold Storage Node may include Cold storage 126 to store a file 120-3, which may be another copy of file 120-1. In an embodiment, Cold storage 126 may comprise one or more long term storage devices, such as optical disk drives. In one embodiment, Cold Storage Node 124 may comprise an optical library system such as Everspan™, commercially available from Sony Optical Archive, Inc., although other data archival systems (such known cloud storage services) may also be used, such as magnetic tape drives. In an embodiment, client computing system 102 may access nodes within data center computing system 106, such as Cold Storage Node 124, via the Simple Storage Service application programming interface (API) (S3), commercially available from Amazon Web Services.

In embodiments of the present invention, application program 130 may request storage and/or retrieval of data in a file from file manager component 128 within client computer system 102. In an embodiment, file manager 128 may be a HDFS™ client, capable of communicating with one or more of Name Node 108, Data Nodes 114, and Cold Storage Node 124 to manage the storage and/or retrieval of files from data center computing system 106. In embodiments, application 130 may have no knowledge of where a selected file is stored in data center computing system 106. That is, application 130 may have no knowledge of whether a selected file is stored in Hot storage in a Data Node, in Warm storage in a Data Node, and/or in Cold storage in a Cold Storage Node. Application 130 may request file manager 128 to store a file to or retrieve a file from data center computing system. File manager 128, in communication with Name Node 108, manages the storage and retrieval of a file to and from a location within data center computing system 106.

Figure 2:
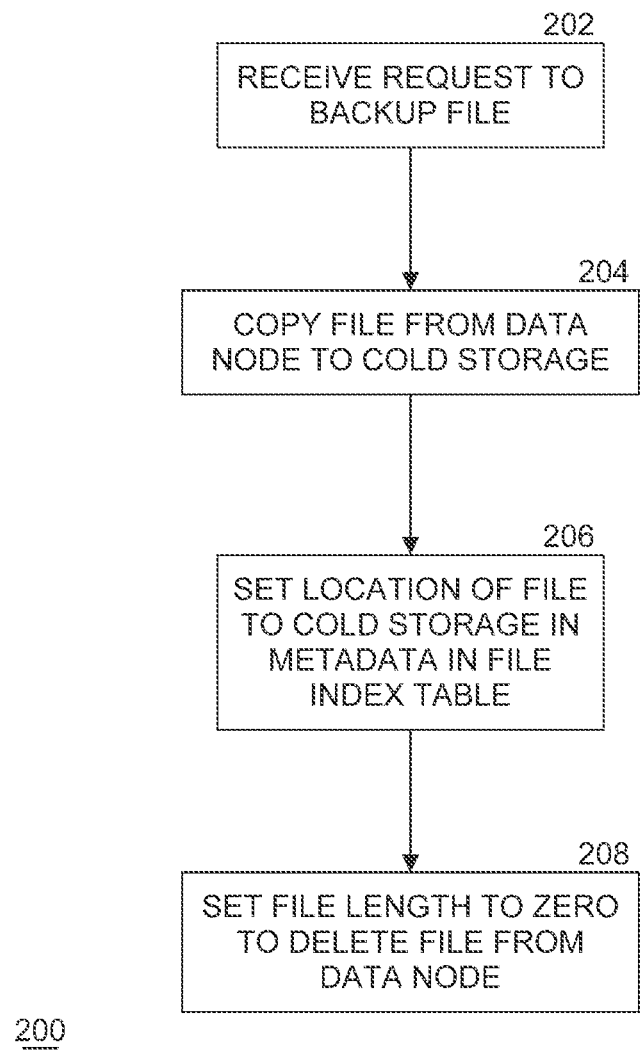
FIG. 2 illustrates an example of a logic flow of a file backup operation.

FIG. 2 illustrates an example of a logic flow of a file backup operation. Application 130 may desire to create a backup of a file, i.e., to cause a file to be copied to Cold storage 126 from Hot storage 116 or Warm storage 118 for long term storage purposes. Application 130 may require the backup as a result of manual interaction with a user (such as a system administrator), or automatically as a result of applying application logic (for example, backup a file according to a time schedule, or when a file reaches a certain maximum size, or when a file is no longer being used by the application, or based on usage metrics collected and acted upon using rules) and so on).

At block 202, file manager 128 may receive a request to back up a file from application 130. In an embodiment, file manager 128 may determine if the file is already stored in Cold storage 126 by requesting information about the file from Name Node 108 over network 104. If so, file backup processing ends since the file is already backed up. Otherwise, at block 204, file manager instructs Name Node 108 to copy the file from the Data Node where the file (120-1 or 120-2) is currently stored to Cold storage 126 in Cold Storage Node 124 (thereby creating file 120-3). The location (s) of the file in data center computing system 106 may be maintained in metadata 112 for the file in file index table 110 in the Name Node. At block 206, file manager 128 instructs Name Node 108 to set the location of the file in data center computing system 106 to the new location in Cold storage 126 by updating the file's location in metadata 112 in file index table 110.

In an embodiment, metadata 112 may be an extended attribute of the file. In Hadoop, extended attributes (abbreviated as xattrs) are a file system feature that allow user applications to associate additional metadata with a file. Unlike system level Mode metadata such as file permissions or modification time, extended attributes are not interpreted by the HDFS™ and are instead used by applications to store additional information about an Mode (i.e., a file). An extended attribute is a name-value pair, with a string name and a binary value. Hadoop supports setting and getting extended attributes as follows.

SETFATTR—set an extended attribute name and value for a file or directory

```
Hadoop fs -setfattr -n name [-v value] | -x name <path>
   -n name        the extended attribute name
   -v value       the extended attribute value
   -x name        remove the extended attribute
   <path>         the file or directory.
```

GETFATTR—get an extended attribute name and value (if any) for a file or directory

```
Hadoop fs -getfattr [-R] -n name | -d [-e en] <path>
   -R             recursively list the attributes for all files and directories
   -n name        dump the named extended attribute value
   -d             dump all extended attribute values associated with pathname
   -e <encoding>  encode values after retrieving them. Valid encodings are text, hex, and base64
   <path>         the file or directory.
```

At block 206, in an embodiment, file manager 128 may send a SETFATTR command to Name Node 108 to set the new file location.

At block 208, file manager 128 instructs Name Node to set the file length of the file to zero in the metadata for the file in the file index table 110. This causes Name Node 108 to delete the file in the Data Node(s) storing the file, thereby reclaiming the storage space for future use. In an embodiment, file manager 128 may send a Hadoop TRUNCATE command to Name Node 108 set the file length to zero.

TRUNCATE—truncate all files that match a specified file pattern to the specified length

```
Hadoop fs -truncate -w <length> <paths>
   -w             flag requesting that the command waits for block recovery to complete, if necessary
   <length>       length of the file
   <path>         the file(s)
```

In other embodiments, instead of using the file length to indicate a storage location for the file, the indication of either Hot storage, Warm storage, or Cold storage may be included as an extended attribute. Without loss of generality, the test criterion will be optimized for the distributed storage solution. In the case of HDFS™ it is cheapest (e.g., fastest) to check for file length versus the existence of an Xattr.

Figure 3:
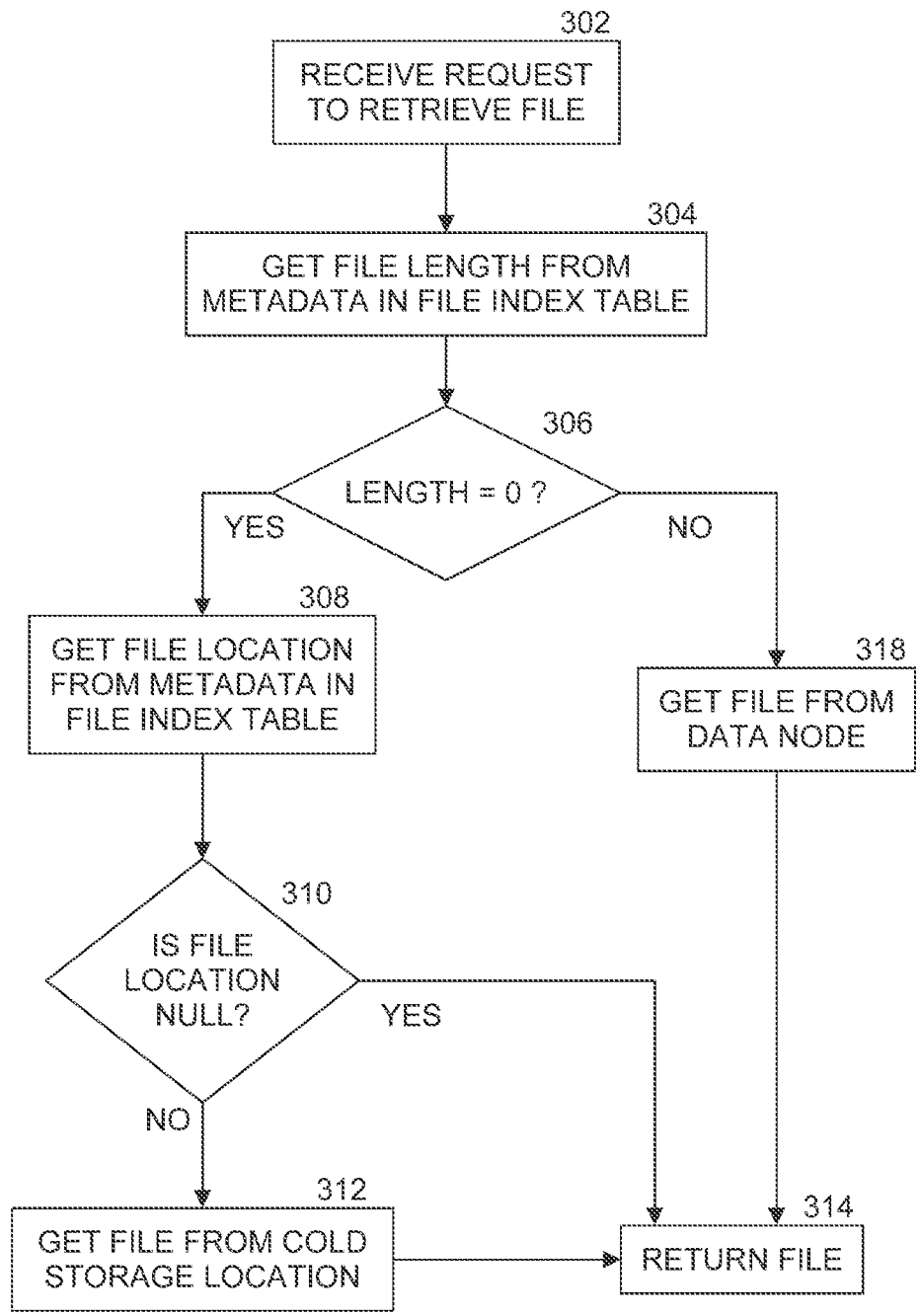
FIG. 3 illustrates an example of a logic flow of a file retrieval operation.

FIG. 3 illustrates an example of a logic flow of a file retrieval operation. Application 130 may desire to retrieve a file from data center computing system 106, without knowing where the file is stored (in Hot storage, Warm storage, or Cold storage). At block 302, file manager 128 receives a request to retrieve a file from application 130. In an embodiment, the request may include the name of the file. At block 304, file manager 128 gets the file length from the metadata 112 for the file in file index table 110. In an embodiment, file manager 128 sends the GETFATTR command to Name Node 108 to get the file length. At block 306, if the file length is equal to zero, then in at least one embodiment this indicates that the file may be stored in Cold Storage Node 124, and file manager 128 gets the file location in Cold storage 126 from metadata 112 in file index table 112 in Name Node 108 at block 308. In one embodiment, checking the file length to be zero for indicating the file's location may be more computationally efficient than getting and analyzing extended attributes for the file (length is an inode attribute). In an embodiment, file manager 128 sends the GETFATTR command to Name Node 108 to get the file location. Next, at block 310 if the file location is null, the file has been created (according to Name Node 108) but has yet to be written to (length is zero) and control may be returned to the application at block 314. If the file location is not null, then at block 312 file manager 128 gets the file 120-3 directly from the Cold storage 126 location (using the Name Node only to get the file's location). The file may be returned at block 314 to the application. In an embodiment, if the length of the file is not zero, then then this indicates that the file is stored in a Data Node 114, and file manager 128 gets the file location in either Hot storage 116 or Warm storage 118 from metadata 112 in file index table 112 in Name Node 108. In an embodiment, file manager 128 sends the GETFATTR command to Name Node 108 to get the file location. At block 318, file manager 128 gets the file 120-3 from the Hot storage 116 location or the Warm storage 118 location, as indicated. The file may then be returned to the application at block 314. Wherever the file is stored (e.g., Hot storage 116, Warm storage 118, or Cold storage 126), file manager 128 uses a file access protocol appropriate to the actual storage location (e.g., in RAM, a SSD, a HDD, or an optical disc). Because file manager 128 is an HDFS™ client, file manager shields application 130 from having to know the implementation details of storing and retrieving the file in the various storage device types.

By retaining the entry for the file in the HDFS™ Name Node's file index table 110, embodiments of the present invention provide a single unified namespace, allowing end users (e.g., applications) to be agnostic of the actual storage medium/media holding the file. This simplifies application data access, be it for running analytics, machine learning, simulation or other purposes. Given the peta bytes of data that flow through the advanced driver assistance systems (ADAS) research and development platform for example, this unified namespace will significantly ease data access, which would otherwise need to be supported through additional indexing.

By releasing the original HDFS™ data blocks in Hot storage (e.g., SSDs) and/or Warm storage (e.g., HDD) storage, which is limited and expensive, storage resources are recovered for re-use.

Embodiments of the present invention provide a performant Cold storage backup solution for HDFS™ that provides a vast improvement over using existing implementations, saving network bandwidth, and saving storage space.

Data in Cold storage is typically immutable and used strictly for read operations (e.g., only reads after write-once to archive the data). In embodiments, applications can access data in Cold storage directly via file manager 128, bypassing the HDPS™ cluster of the Name Node and Data Nodes, should the applications choose to do so, or should the HDFS™ cluster be repurposed at some later date for other activity. Even when working via the Name Node of the HDFS™ cluster, the present architecture provides data access without requiring a hop to the Data Node, and thus increases data access and throughput for data residing in Cold storage 126.

Although embodiments of the present invention have been illustrated as applying to Hadoop, embodiments may also be implemented in other distributed file systems such as Ceph (available on the Internet at www.ceph.com) (where a Name Node is similar to an Object Storage Daemon (OSD), OpenStack SwiftStack (available on the Internet at www.swiftstack.com), and/or Gluster FS (available on the Internet at www.gluster.org), and embodiments of the present invention are not limited to Hadoop.

Figure 4:
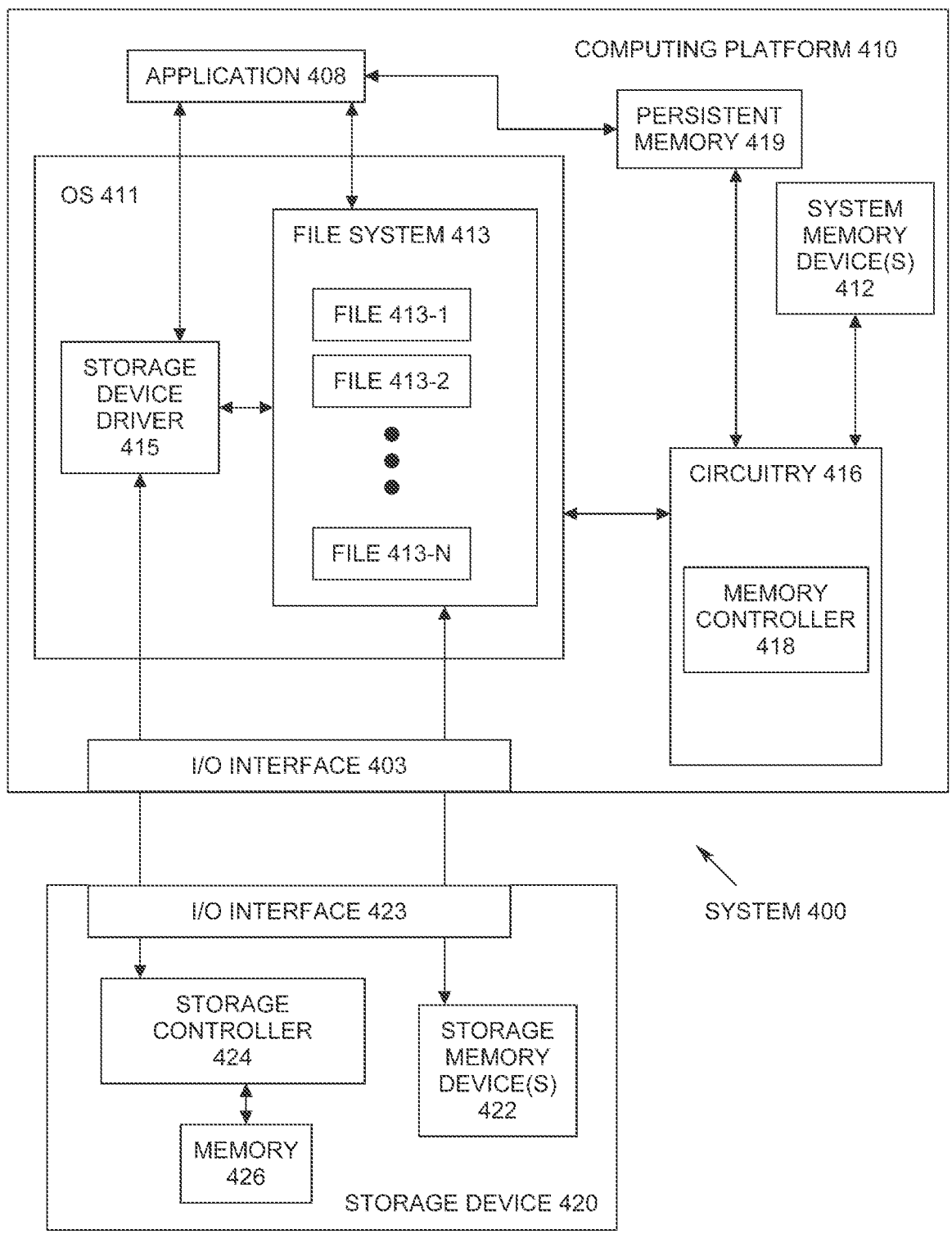
FIG. 4 illustrates another example computing system.

FIG. 4 illustrates another example computing system. In embodiments of the present invention, computing system 400 may be representative of one or more of client computing system 102, Data Node(s) 114, Name Node 108, and/or Cold Storage Node 124.

In some examples, as shown in FIG. 4, system 400 includes a computing platform 410 coupled to one or more storage devices 420 through I/O interface 403 and I/O interface 423. As shown in FIG. 4, computing platform 410 may include an operating system (OS) 411, one or more system memory device(s) 412, circuitry 416 and application 408. In an embodiment, application 408 may include file manager 128 of FIG. 1. In another embodiment, file manager 128 may be a part of OS 411. For these examples, circuitry 416 may be capable of executing various functional elements of computing platform 410 such as OS 411 and application 408 that may be maintained, at least in part, within system memory device(s) 412. Circuitry 416 may include host processing circuitry to include one or more central processing units (CPUs) (not shown) and associated chipsets and/or controllers.

According to some examples, as shown in FIG. 4, OS 411 may include file system 413 and one or more storage device drivers 415, and one or more storage devices 420 may include a storage controller 424, one or more storage memory device(s) 422 and memory 426. OS 411 may be arranged to implement storage device driver 415 to coordinate at least temporary storage of data for a file from among files 413-1 to 413-n, where "n" is any whole positive integer >1, to storage memory device(s) 422. The data, for example, may have originated from or may be associated with executing at least portions of OS 411 or application programs. OS 411 communicates one or more commands and transactions with storage device 420 to write data to or read data from storage device 420. The commands and transactions may be organized and processed by logic and/or features at storage device 420 to write the data to or read data from storage device 420.

In some examples, storage controller 424 may include logic and/or features to receive transaction requests to storage memory device(s) 422 at storage device 420. For these examples, the transaction requests may be initiated by or sourced from OS 411 that may, in some embodiments, utilize file system 413 to write/read data to/from storage device 420 through input/output (I/O) interfaces 403 and 423.

In some examples, storage device 420 may comprise one or more SSDs, HDDs, optical disks, or other storage types. In an embodiment, when computing platform 410 is a Data Node, storage device may include one or more SSDs and/or one or more HDDs. In an embodiment, when computing platform 410 is a Cold storage node, storage device may include one or more optical disks.

In some examples, memory 426 may include volatile types of memory including, but not limited to, RAM, D-RAM, DDR SDRAM, SRAM, T-RAM or Z-RAM. One example of volatile memory includes DRAM, or some variant such as SDRAM. A memory subsystem as described herein may be compatible with a number of memory technologies, such as DDR4 (DDR version 4, initial specification published in September 2012 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (LPDDR version 5, currently in discussion by JEDEC), HBM2 (HBM version 2, currently in discussion by JEDEC), and/or others, and technologies based on derivatives or extensions of such specifications.

However, examples are not limited in this manner, and in some instances, memory 426 may include non-volatile types of memory, whose state is determinate even if power is interrupted to memory 426. In some examples, memory 426 may include non-volatile types of memory that is a block addressable, such as for NAND or NOR technologies. Thus, memory 426 can also include a future generation of types of non-volatile memory, such as a 3-dimensional cross-point memory (3D XPoint™ commercially available from Intel Corporation), or other byte addressable non-volatile types of memory. According to some examples, memory 426 may include types of non-volatile memory that includes chalcogenide glass, multi-threshold level NAND flash memory, NOR flash memory, single or multi-level Phase Change Memory (PCM), a resistive memory, nanowire memory, FeTRAM, MRAM that incorporates memristor technology, or STT-MRAM, or a combination of any of the above, or other memory.

In some examples, storage memory device(s) 422 may be a device to store data from write transactions and/or write operations. Storage memory device(s) 422 may include one or more chips or dies having gates that may individually include one or more types of non-volatile memory to include, but not limited to, NAND flash memory, NOR flash memory, 3-D cross-point memory (3D XPoint™), ferroelectric memory, SONOS memory, ferroelectric polymer memory, FeTRAM, FeRAM, ovonic memory, nanowire, EEPROM, phase change memory, memristors or STT-MRAM. For these examples, storage device 420 may be arranged or configured as a SSD, a HDD, or an optical disc drive.

According to some examples, communications between storage device driver 415 and storage controller 424 for data stored in storage memory devices(s) 422 and accessed via files 413-1 to 413-n may be routed through I/O interface 403 and I/O interface 423. I/O interfaces 403 and 423 may be arranged as a Serial Advanced Technology Attachment (SATA) interface to couple elements of server 410 to storage device 420. In another example, I/O interfaces 403 and 423 may be arranged as a Serial Attached Small Computer System Interface (SCSI) (or simply SAS) interface to couple elements of computing platform 410 to storage device 420. In another example, I/O interfaces 403 and 423 may be arranged as a Peripheral Component Interconnect Express (PCIe) interface to couple elements of server 410 to storage device 420. In another example, I/O interfaces 403 and 423 may be arranged as a Non-Volatile Memory Express (NVMe) interface to couple elements of computing platform 410 to storage device 420. For this other example, communication protocols may be utilized to communicate through I/O interfaces 403 and 423 as described in industry standards or specifications (including progenies or variants) such as the Peripheral Component Interconnect (PCI) Express Base Specification, revision 3.1, published in November 2014 ("PCI Express specification" or "PCIe specification") or later revisions, and/or the Non-Volatile Memory Express (NVMe) Specification, revision 1.2, also published in November 2014 ("NVMe specification") or later revisions. Alternatively, the interconnect may be silicon photonics-based.

In some examples, system memory device(s) 412 may store information and commands which may be used by circuitry 416 for processing information. Also, as shown in FIG. 4, circuitry 416 may include a memory controller 418. Memory controller 418 may be arranged to control access to data at least temporarily stored at system memory device(s) 412 for eventual storage to storage memory device(s) 422 at storage device 420.

In some examples, storage device driver 415 may include logic and/or features to forward commands associated with one or more read or write transactions and/or read or write operations originating from OS 411. For example, the storage device driver 415 may forward commands associated with write transactions such that data may be caused to be stored to storage memory device(s) 422 at storage device 420.

System Memory device(s) 412 may include one or more chips or dies having volatile types of memory such RAM, D-RAM, DDR SDRAM, SRAM, T-RAM or Z-RAM. However, examples are not limited in this manner, and in some instances, system memory device(s) 412 may include non-volatile types of memory, including, but not limited to, NAND flash memory, NOR flash memory, 3-D cross-point memory (3D XPoint™), ferroelectric memory, SONOS memory, ferroelectric polymer memory, FeTRAM, FeRAM, ovonic memory, nanowire, EEPROM, phase change memory, memristors or STT-MRAM.

Persistent memory 419 may include one or more chips or dies having non-volatile types of memory, including, but not limited to, NAND flash memory, NOR flash memory, 3-D cross-point memory (3D XPoint™), ferroelectric memory, SONOS memory, ferroelectric polymer memory, FeTRAM, FeRAM, ovonic memory, nanowire, EEPROM, phase change memory, memristors or STT-MRAM.

According to some examples, computing platform 410 may include, but is not limited to, a server, a server array or server farm, a web server, a network server, an Internet server, a work station, a mini-computer, a main frame computer, a supercomputer, a network appliance, a web appliance, a distributed computing system, a personal computer, a tablet computer, a smart phone, multiprocessor systems, processor-based systems, an automotive system, a flying drone, an IoT device, or any combination thereof.

FIG. 2 and FIG. 3 illustrated logic flows of storage management operations. For these examples, these processes may be implemented by or use components or elements of system 400 shown in FIG. 4 such as application 408 (which may include file manager 128), OS 411, circuitry 416, persistent memory 419, system memory device(s) 412, storage device 420, storage controller 424, memory 426, and/or storage memory device(s) 422. However, this process is not limited to being implemented by or use only these components or elements of system 400. Logic flows 200 and 300 may be representative of some or all of the operations executed by one or more logic, features, or devices described herein.

In an embodiment, flows 200 and 300 may be implemented in file manager 128 of system 100 shown in FIG. 1, or application 408 of computing platform 400 of FIG. 4. In another embodiment, flows 200 and 300 may be implemented in circuitry 416 of system 400 shown in FIG. 4.

Included herein is a set of logic flows representative of example methodologies for performing novel aspects of the disclosed architecture. While, for purposes of simplicity of explanation, the one or more methodologies are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 5:
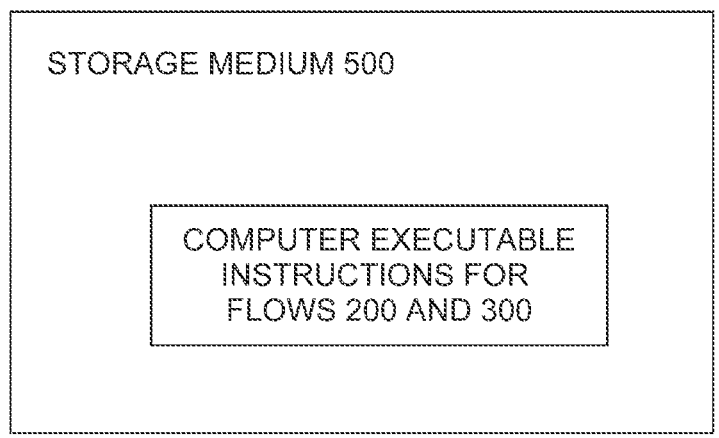
FIG. 5 illustrates an example storage medium.

FIG. 5 illustrates an example of a storage medium. The storage medium 500 may comprise an article of manufacture. In some examples, storage medium 500 may include any non-transitory computer readable medium or machine readable medium, such as an optical, magnetic or semiconductor storage. Storage medium 500 may store various types of computer executable instructions, such as instructions to implement logic flows described above. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

According to some examples, a component called circuitry 416 of FIG. 4 may execute processing operations or logic for file manager 128 and/or storage medium 500. Circuitry 416 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, ASIC, programmable logic devices (PLD), digital signal processors (DSP), FPGA/programmable logic, memory units, logic gates, registers, semiconductor device, chips, microchips, chip sets, and so forth. Examples of software elements may include software components, programs, applications, computer programs, application programs, device drivers, system programs, software development programs, operating system software, middleware, firmware, software components, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 410 may be part of a computing device that may be, for example, user equipment, a computer, a personal computer (PC), a desktop computer, a laptop computer, a notebook computer, a netbook computer, a tablet, a smart phone, embedded electronics, a gaming console, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 410 described herein, may be included or omitted in various embodiments of computing platform 410, as suitably desired.

The components and features of computing platform 410 may be implemented using any combination of discrete circuitry, ASICs, logic gates and/or single chip architectures. Further, the features of computing platform 410 may be implemented using microcontrollers, programmable logic arrays and/or microprocessors or any combination of the foregoing where suitably appropriate. It is noted that hardware, firmware and/or software elements may be collectively or individually referred to herein as "logic", "circuit" or "circuitry."

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other via some network connectivity (e.g., which may include wireless).

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   circuitry; and
   logic for execution by the circuitry to:
   receive, by a file manager to be executed by a first computing system, a request to back up a file in a distributed file system provided by a second computing system, the second computing system having one or more data nodes and a cold storage node, the one or more data nodes including at least one hot storage device and at least one warm storage device, the cold storage node including a cold storage device, to the cold storage device;
   copy, by the file manager, the file from one of the at least one hot storage device and the at least one warm storage device of the at least one data node of the distributed file system to the cold storage device;
   set, by the file manager, a location of the file in the cold storage device in a name node of the distributed file system;
   set, by the file manager, a field for a length of the file to zero in the name node;
   receive, by the file manager, a request to retrieve the file from the distributed file system from a requester;
   get, by the file manager, the length of the file from the name node of the distributed file system;

get, by the file manager, the file from one of the at least one hot storage device and the at least one warm storage device of the at least one data node of the distributed file system when the file length is not zero, get, by the file manager, the location of the file in the cold storage device of the cold storage node from the name node and get the file from the cold storage device when the file length is zero; and return, by the file manager, the file to the requester.

2. The apparatus of claim 1, the logic for execution by the circuitry to cause deletion of the file, by the file manager, in one of the at least one hot storage device and the at least one warm storage device of the at least one data node when the file length is set to zero.

3. The apparatus of claim 1, wherein the name node to store the location of the file in metadata in a file index table in the name node.

4. The apparatus of claim 3, wherein the metadata comprises one or more extended attributes of the file.

5. The apparatus of claim 1, wherein the at least one hot storage device comprises one or more of a random-access memory (RAM) and a solid-state drive (SSD), the at least one warm storage device comprises a hard disk drive (HDD), and the cold storage device comprises one or more of an optical disk drive and a tape drive.

6. The apparatus of claim 1, wherein the distributed file system comprises one of Apache Hadoop, Ceph, and OpenStack Swift.

7. A method comprising:
receiving, by a file manager to be executed by a first computing system, a request to back up a file in a distributed file system provided by a second computing system, the second computing system having one or more data nodes and a cold storage node, the one or more data nodes including at least one hot storage device and at least one warm storage device, the cold storage node including a cold storage device, to the cold storage device;

copying, by the file manager, the file from one of the at least one hot storage device and the at least one warm storage device of the at least one data node of the distributed file system to the cold storage device;

setting, by the file manager, a location of the file in the cold storage device in a name node of the distributed file system;

setting, by the file manager, a field for a length of the file to zero in the name node;

receiving, by the file manager, a request to retrieve the file from the distributed file system from a requester;

getting, by the file manager, the length of the file from the name node of the distributed file system;

getting, by the file manager, the file from one of the at least one hot storage device and the at least one warm storage device of the at least one data node of the distributed file system when the file length is not zero, getting, by the file manager, the location of the file in the cold storage device of the cold storage node from the name node and get the file from the cold storage device when the file length is zero; and returning, by the file manager, the file to the requester.

8. The method of claim 7, comprising causing deletion, by the file manager, of the file in one of the at least one hot storage device and the at least one warm storage device of the at least one data node when the file length is set to zero.

9. The method of claim 7, comprising causing storing the location of the file in metadata in a file index table in the name node.

10. The method of claim 9, wherein the metadata comprises one or more extended attributes of the file.

11. The method of claim 7, wherein the distributed file system comprises one of Apache Hadoop, Ceph, and OpenStack Swift.

12. At least one non-transitory machine readable medium comprising a plurality of instructions that in response to being executed by a processor at a first computing system, cause the processor to:
receive, by a file manager to be executed by the processor of the first computing system, a request to back up a file in a distributed file system provided by a second computing system, the second computing system having one or more data nodes and a cold storage node, the one or more data nodes including at least one hot storage device and at least one warm storage device, the cold storage node including a cold storage device, to the cold storage device;

copy, by the file manager, the file from one of the at least one hot storage device and the at least one warm storage device of the at least one data node of the distributed file system to the cold storage device;

set, by the file manager, a location of the file in the cold storage device in a name node of the distributed file system;

set, by the file manager, a field for a length of the file to zero in the name node;

receive, by the file manager, a request to retrieve the file from the distributed file system from a requester;

get, by the file manager, the length of the file from the name node of the distributed file system;

get, by the file manager, the file from one of the at least one hot storage device and the at least one warm storage device of the at least one data node of the distributed file system when the file length is not zero, get, by the file manager, the location of the file in the cold storage device of the cold storage node from the name node and get the file from the cold storage device when the file length is zero; and return, by the file manager, the file to the requester.

13. The at least one non-transitory machine readable medium of claim 12, comprising instructions to cause deletion, by the file manager, of the file in one of the at least one hot storage device and the at least one warm storage device of the at least one data node when the file length is set to zero.

14. The at least one non-transitory machine readable medium of claim 12, comprising instructions to cause storing the location of the file in metadata in a file index table in the name node.

15. The at least one non-transitory machine readable medium of claim 14, wherein the metadata comprises one or more extended attributes of the file.

16. The at least one non-transitory machine readable medium of claim 12, wherein the distributed file system comprises one of Apache Hadoop, Ceph, and OpenStack Swift.

* * * * *